UNITED STATES PATENT OFFICE.

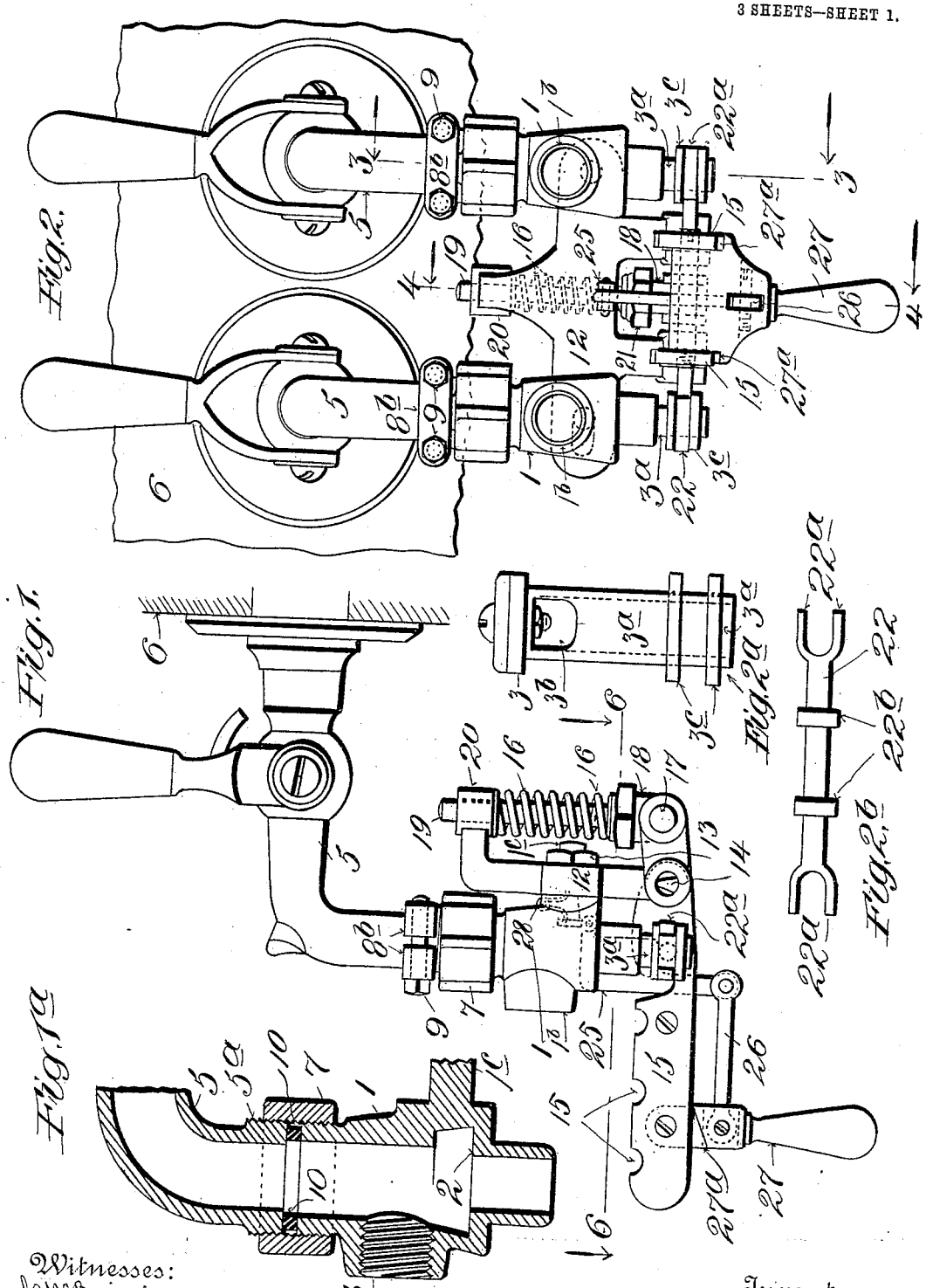

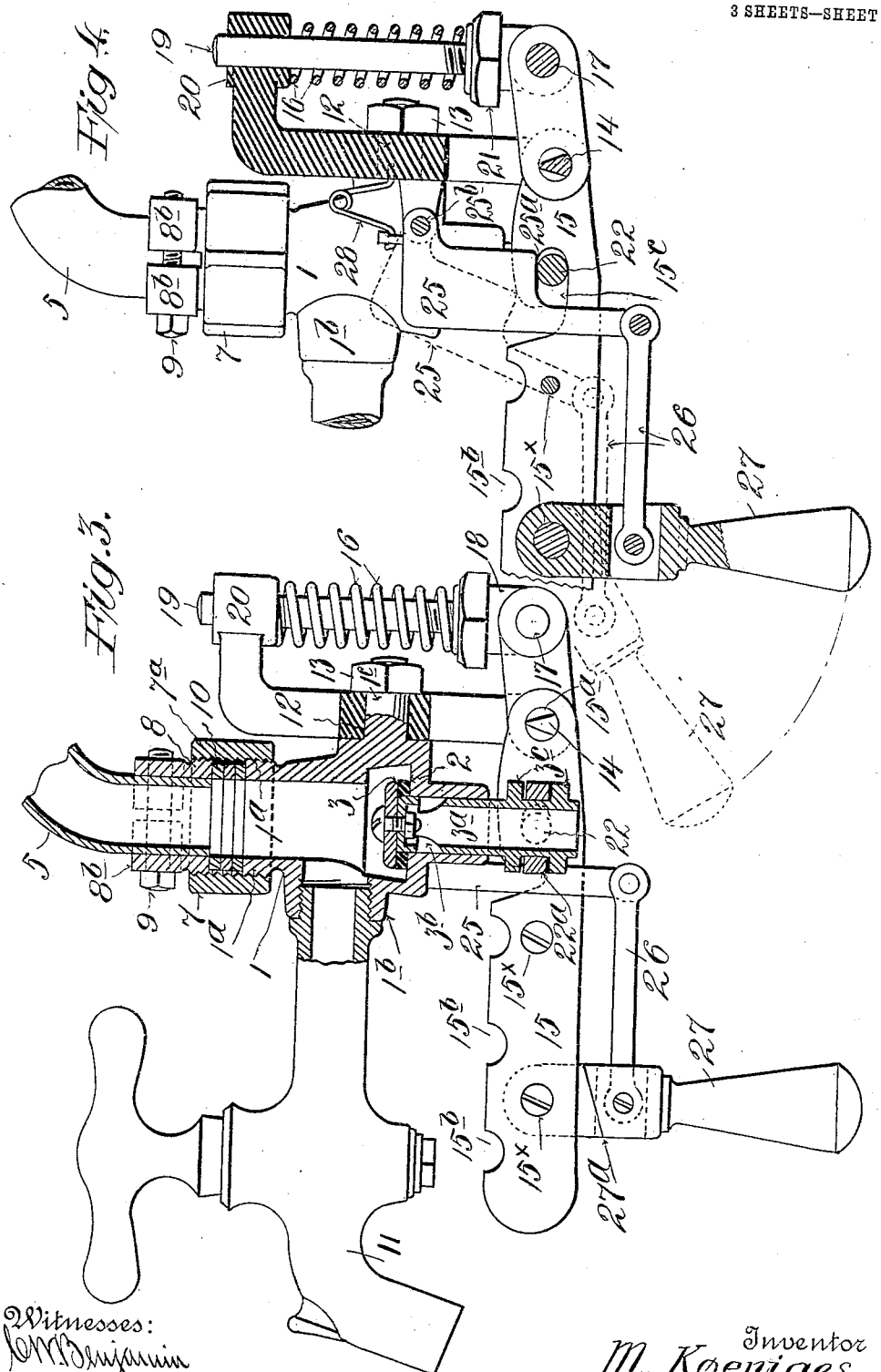

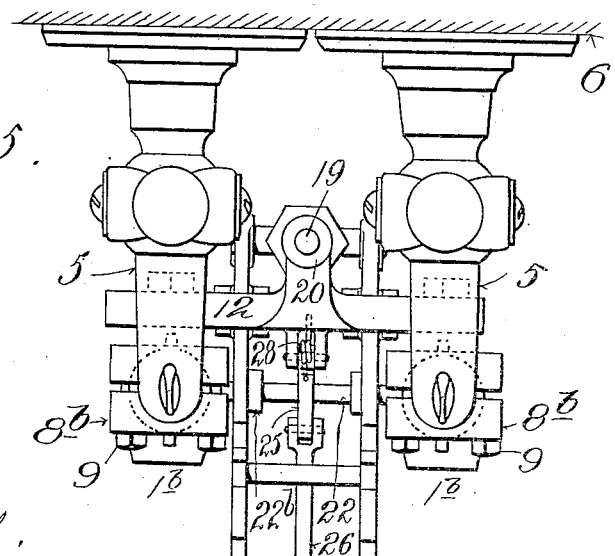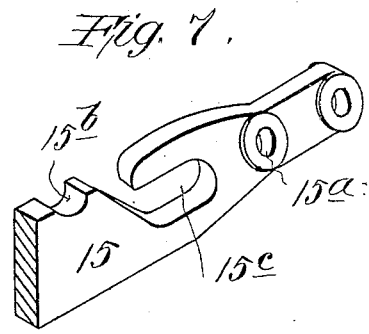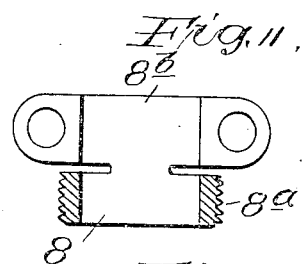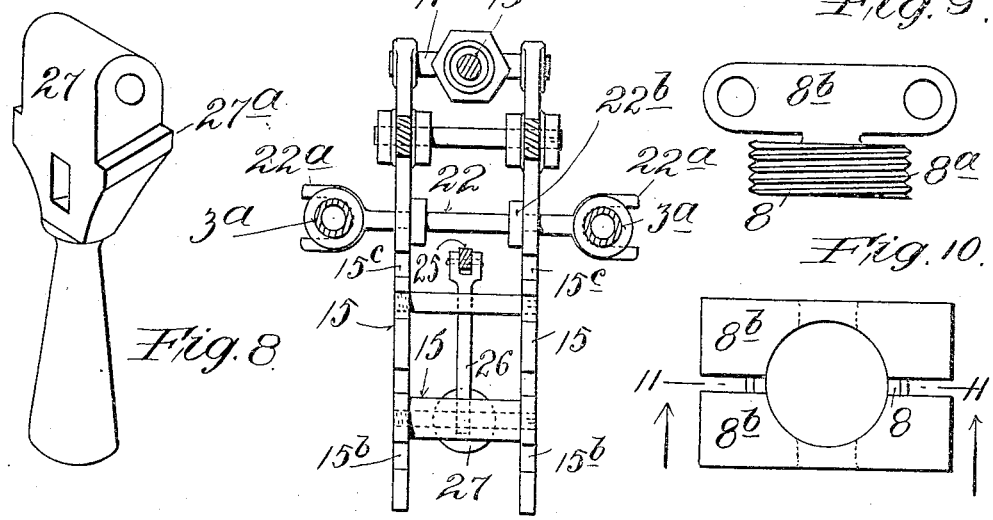

MARTIN KOENIGES, OF NEW YORK, N. Y.

MEASURING-FAUCET.

933,255.

Specification of Letters Patent. Patented Sept. 7, 1909.

Application filed October 20, 1908. Serial No. 458,733.

*To all whom it may concern:*

Be it known that I, MARTIN KOENIGES, a citizen of the United States, and resident of New York city, in the county of New York and State of New York, have invented certain new and useful Improvements in Measuring-Faucets, of which the following is a specification.

The object of my invention is to provide improved means for causing the automatic closing of a faucet when a receptacle attached thereto has been filled with liquid to a predetermined amount.

A further object of the invention is to enable the receptacle to receive liquid from two or more sources simultaneously, or from either one of said sources as desired, with the same automatic closing off of the flow of liquid when the receptacle is filled to a predetermined amount, and a further object of the invention is to permit liquid to be drawn off independently, as in a glass, while the receptacle is being automatically filled and without interference one with the other.

My invention comprises the novel details of improvement and combinations of parts that will be more fully hereinafter set forth and then pointed out in the claims.

Reference is to be had to the accompanying drawings forming part hereof, wherein, Figure 1 is a side view of my improved measuring faucet; Fig. 1$^a$ is an enlarged sectional view of part thereof, showing a modification; Fig. 2 is a front view, looking from the left in Fig. 1, showing the duplicate faucets and my improved means for automatically controlling the flow from the same; Fig. 2$^a$ is a detail of the valve; Fig. 2$^b$ is a detail of the bar for controlling two valves simultaneously; Fig. 3 is a detail side view, partly in section on the line 3, 3, in Fig. 2; Fig. 4 is a detail view, partly in section on the line 4, 4, in Fig. 2; Fig. 5 is a plan view of Fig. 1; Fig. 6 is a horizontal section substantially on the line 6, 6, in Fig. 1; Fig. 7 is a detail view of part of the valve-controlling lever; Fig. 8 is a detail of the arm for controlling the lever locking and releasing devices; Fig. 9 is a detail of a coupling for supporting the devices from an ordinary faucet; Fig. 10 is a plan view of Fig. 9, and Fig. 11 is a section on the line 11, 11, in Fig. 10.

Similar numerals of reference indicate corresponding parts in the several views.

The numeral 1 indicates a valve casing of suitable construction, having a seat 2 to receive a suitable valve 3 which has a hollow depending stem 3$^a$ and one or more side openings 3$^b$ beneath the valve head for the passage of liquid from the interior of casing 1 into and through bore of stem 3$^a$. Casing 1 is to be attached to a liquid supply source, and I have shown the same adapted to be detachably connected with any well known faucet, such as faucets connected by suitable piping with beer under pressure, such faucets usually projecting from a counter 6. To detachably connect casing 1 with faucet 5 I have shown said casing provided with threads 1$^a$ receiving interior threads 7$^a$ on a coupling 7, the coupling also engaging threads 8$^a$ on a ring 8, the upper end of which is split or divided forming two arms 8$^b$ having an inner bore to fit on the end of the faucet and clamped firmly thereon by bolts or screws 9, suitable washers being interposed at 10 (see Figs. 3, 9, 10 and 11), whereby the casing may be detachably connected with the smooth or unthreaded end of faucet 5. Where the faucet 5 is provided with threads, as at 5$^a$, the coupling 7 may directly connect the threads 1$^a$ of the casing with the threads 5$^a$, as in Fig. 1$^a$. Casing 1 is shown provided with a branch 1$^b$, above seat 2 and valve 3, to which a suitable faucet 11 may be attached for drawing liquid directly from the casing.

At 12 is a bar or lever-support shown attached to the rear of casing 1, as by nuts 13 engaging threads on the ends of stem 1$^c$ projecting from the casing, which bar carries bearings 14 that receive openings 15$^a$ of a lever 15, shown having two parallel arms suitably spaced apart and secured together by cross pieces 15$^x$, said lever being provided with notches 15$^b$ on the upper edge that are suitably spaced apart adapted to receive the handle of a pail for suspending the pail beneath valve stem 3$^a$. Lever 15 is acted upon by a spring 16, for which purpose the rear end of lever 15 is shown provided with a swiveled rod 17 having a head 18 from which a stem 19 projects and slides through a guide 20 carried by bar 12, the spring 16 bearing against said guide and against a nut 21 threaded on stem 19, whereby the tension of spring 16 may be regulated, the tendency of spring 16 being to normally raise the outer end of lever 15. Lever 15 is connected with and controls valve 3, for which purpose I have provided lever 15 with a cross bar 22 having forks 22ª at its ends that fit between shoulders 3ᶜ at the lower portions of valve stems 3ª below casing 1.

To readily connect bar 22 with lever 15 I have shown the latter provided with recesses 15ᶜ opening through the upper surface thereof and undercut so that bar 22 may be slid sidewise into and from said recesses and connected with valve stems 3ª. Said bar 22 is shown provided with shoulders 22ᵇ to fit against the arms of lever 15 and keep said bar from sliding (see Fig. 6). The arrangement is such that spring 16 tends normally to lift valves 3 from their seats, but such spring is maintained at such tension that when valves are upon their seats the pressure of the fluid in casings 1 will serve to keep the valves closed.

To maintain valves 3 closed against danger of opening from decreasing fluid pressure I provide a lock arranged as follows: At 25 is an arm pivotally connected as at 25ᵇ to the bar 12 (see Fig. 4) and provided with a shoulder 25ª adapted to pass over bar 22 as in Fig. 4, a link 26 pivotally connecting arm 25 with handle 27 that is pivotally connected with the bar 15ˣ, shoulder 27ª being adapted to engage lever 15 when handle 27 is pulled forwardly. Assuming that the parts are in the positions shown in Figs. 1, 2, 3 and 4, with the faucets 5 normally open the liquid under pressure in casings 1 will bear upon valves 3. A handle of a pail then being placed in one of the notches 15ᵇ, which correspond to the quantity of liquid that may pass until the flow is automatically shut off, handle 27 is pulled forwardly which moves arm 25 from over bar 22, (as in dotted lines in Fig. 4), whereupon lever 15 and the pail will be raised, thereby simultaneously raising valves 3 from their seats, and thereupon liquid will flow from both faucets 5 into the pail through the hollow stems 3ª. As the liquid can now flow under valves 3 the latter will not close by the liquid pressure as the latter is balanced with respect to the valves. As soon as the liquid in the pail is of such weight as to overcome spring 16, lever 15 will have been moved downwardly until valves 3 close upon their seats, and the flow of liquid to the pail is thus automatically shut off; arm 25 will thereupon pass over bar 22 to retain the parts locked when the pail is removed. If the pail is hung upon the outermost notches 15ᵇ it is evident that less liquid in the pail will cause closing of the valves than if the pail were hung upon the innermost notches of lever 15, and so on for intermediate notches, the idea being that according to the price or quantity of liquid being purchased the pail will be hung upon the appropriate notch of lever 15 and there left until the flow is automatically cut off. While the pail is being filled, or independently of filling the pail, liquid may be drawn from either faucet 5 through the corresponding faucet 11.

While I have described the device as being used for filling the pail from both faucets 5 simultaneously, such is only an incident of operation, as where it is desired to draw into the pail from two separate sources simultaneously. When it is desired to draw from one source independently it is merely necessary to close the appropriate faucet 5 while permitting the liquid to flow from the other faucet, the arrangement of parts being such that both faucets may normally be left open, and either one closed as may be required.

My invention is not limited to the details of construction shown and described as the same may be changed within the scope of the appended claims without departing from the spirit of my invention.

Having now described my invention what I claim is:—

1. The combination of a casing provided with a seat, a valve for said seat, a hollow stem for said valve provided with an inlet and an outlet below the valve, means connected with the valve and adapted to receive a pail, and means acting with the lever tending normally to open the valve.

2. The combination of a casing provided with a seat, a valve for said seat, a hollow stem for said valve provided with an inlet and an outlet below the valve, a lever connected with the valve and adapted to receive a pail, a spring acting with the lever tending normally to open the valve, and means for locking the valve upon its seat.

3. The combination of a casing provided with a seat, a valve for said seat, a lever connected with the valve and adapted to receive a pail, a spring acting with the lever tending to normally open the valve, and a faucet connected with said casing above the valve seat.

4. The combination of a casing provided with a valve seat, a valve having a depending hollow stem provided with an inlet and an outlet, a lever connected with said valve, and a spring acting with the lever and tending normally to open the valve, said lever being provided with means to support a pail at different distances from the spring to close the valve against the resistance of the spring.

5. The combination of a pair of casings, means to secure said casings to corresponding faucets, means to support a lever in connection with said casings, seats within the casings, valves for said seats, said lever being connected with said valves and adapted to receive and support a pail and a spring acting with said lever tending normally to open the valves.

6. The combination of a pair of casings, means to secure said casings to corresponding faucets, means to support a lever in connection with said casings, seats within the casings, valves for said seats, said lever being connected with said valves and adapted to receive and support a pail, a spring acting with said lever tending normally to open the valves, and means to lock the lever in position to keep the valves closed.

7. The combination of a pair of casings each provided with a seat, a bar connected with said casings, a lever supported by said bar, valves for said seats provided with hollow stems having inlets and outlets, means connecting said lever with said valves, and a spring acting on said lever tending normally to open said valves, whereby fluid may flow from separate sources simultaneously past said valves into a pail hanging upon the lever.

8. The combination of a plurality of faucets connected with separate fluid sources, a pair of casings each connected with one of said faucets, each casing having a valve seat, a valve for each seat, a lever connected with said valves, and a spring acting with said lever.

9. The combination of a plurality of faucets connected with separate fluid sources, a pair of casings each connected with one of said faucets, each casing having a valve seat, a valve for each seat, a lever connected with said valves, a spring acting with said lever, and an independent faucet attached to each casing above the corresponding valve seat.

10. The combination of a casing provided with a seat, a valve for said seat, having a depending stem, means to permit the flow of fluid from said valve, a lever connected with the valve, a spring acting with the lever, an arm to hold the lever to keep the valve seated, a handle connected with said lever and with said arm arranged to move the arm to release the lever and simultaneously lift the lever to unseat the valve.

11. The combination of a casing provided with a seat, a valve for said seat, a lever connected with the valve, a spring acting with the lever, a threaded ring having arms to grip a faucet, means to clamp the arms upon the faucet, and a coupling to connect said ring with the casing for detachably supporting the casing upon the faucet.

Signed at New York city, in the county of New York, and State of New York, this 16th day of October, A. D. 1908.

MARTIN KOENIGES.

Witnesses:
 MARIE F. WAINRIGHT,
 T. F. BOURNE.